(12) United States Patent
Arisaka et al.

(10) Patent No.: US 6,970,330 B2
(45) Date of Patent: Nov. 29, 2005

(54) MAGNETIC DISK DRIVE WITH CARRIAGE HAVING BOBBIN SUPPORTING ANNULAR COIL CONNECTED BY CONNECTION MEMBERS

(75) Inventors: Toshihiro Arisaka, Odawara (JP); Hiromitsu Masuda, Odawara (JP); Toshihiko Shimizu, Yasato (JP); Gentaro Nakamura, Odawara (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 71 days.

(21) Appl. No.: 10/278,809

(22) Filed: Oct. 24, 2002

(65) Prior Publication Data

US 2003/0081355 A1 May 1, 2003

(30) Foreign Application Priority Data

Oct. 25, 2001 (JP) .............................. 2001-327092

(51) Int. Cl.[7] .............................................. G11B 5/54
(52) U.S. Cl. ..................................................... 360/265
(58) Field of Search ............................ 360/265, 264.7, 360/264.3, 264.1, 260, 240, 266.9

(56) References Cited

U.S. PATENT DOCUMENTS 6,404,596 B1 * 6/2002 McReynolds et al. ... 360/265.8
6,532,136 B2 * 3/2003 Bae et al. ................ 360/256.2
6,600,633 B2 * 7/2003 Macpherson et al. .... 360/265.8
2004/0075949 A1 * 4/2004 Dague et al. ............. 360/265.8

FOREIGN PATENT DOCUMENTS

EP           0576839 A2 *  1/1994
JP           A-63-277458    11/1988

OTHER PUBLICATIONS

"Ceramic coil stiffener for higher coil stiffness and better heat radiation", IBM TDB Feb. 2002, No. 454 p. 285.*

* cited by examiner

Primary Examiner—Julie Anne Watko
(74) Attorney, Agent, or Firm—Antonelli, Terry, Stout and Kraus, LLP.

(57) ABSTRACT

A magnetic disk drive comprises at least one magnetic head for reading and writing information on at least one magnetic disk, a carriage supporting the magnetic head over the magnetic disk for movement of the magnetic head about a predetermined shaft, an annular coil supported by a bobbin provided on the carriage and subjected to an electromagnetic force for driving the carriage. The drive further comprises a first connection member for joining the annular coil and the bobbin, an in-coil member arranged inside the annular coil, and a second connection member for joining the in-coil member and the annular coil. A modulus of longitudinal elasticity of the in-coil member is larger than that of the first or second connection member. The drive thus formed has the increased carriage rigidity, the improved positioning accuracy of a magnetic head and the increased recording capacity of the disk.

7 Claims, 8 Drawing Sheets

MAGNETIC DISK DRIVE WITH CARRIAGE HAVING BOBBIN SUPPORTING ANNULAR COIL CONNECTED BY CONNECTION MEMBERS

BACKGROUND OF THE INVENTION

The present invention relates to a construction for positioning a magnetic head of a magnetic disk drive.

To increase a recording density of a magnetic disk drive, it is effective to reduce errors in positioning a read/write head on a disk so as to allow information to be stored in a narrower area. For a positioning operation of a magnetic head relative to a magnetic disk surface, it has been common to use a swing type carriage, on which the magnetic head is mounted, and a voice coil motor (VCM) for driving the carriage. The swinging carriage is provided to be pivotable about a pivot shaft and carries the magnetic head at an end thereof on one side of this shaft. Further, between the magnetic head and the pivot shaft are provided a suspension, to which the magnetic head is mounted, and a carriage arm, to which a base portion of the suspension is attached. The suspension supports the magnetic head while urging it toward the magnetic disk surface. On the other side of the pivot shaft opposite the magnetic head, there are a coil of the voice coil motor and a coil bobbin attached with the coil.

With this construction, an electromagnetic force is generated by an electric field acting on the coil supported inside the coil bobbin, and it causes the carriage to rotate about the pivot shaft so as to move in a plane almost perpendicular to the axis of the pivot shaft. This causes the magnetic head, which is mounted on a slider at a front end of the suspension to be moved and positioned above the disk surface.

The force applied to the carriage when driven about the pivot shaft acts as a vibration force that causes vibration in the carriage. Among resonance modes of the carriage, a resonance mode, in which the carriage as a whole deforms and vibrates in the direction of a head movement about a target position on the disk where the head is to be positioned or about an imaginary line connecting the pivot shaft and the magnetic head (hereinafter referred to as a main resonance mode), constitutes a factor in limiting a servo band of a positioning control system. So, for the carriage main resonance mode, it is required that a resonance frequency of the carriage be set as high as possible.

This main resonance mode is a vibration mode that can be modeled by a carriage mass and an overall spring rigidity, which is a combination of a rigidity of a bearing (pivot bearing) supporting the carriage for swing motion and a flexural rigidity of the carriage against its entire bending. From this, to increase the main resonance frequency, it is necessary to improve the flexural rigidity of the carriage.

A means for joining the coil to the bobbin formed integral with the carriage includes bonding or insert-molding using resin such as liquid crystal polymer. The former requires a jig when applying and hardening an adhesive, whereas the latter is advantageous in that it requires only performing injection molding with a mold. Whichever assembling method is selected, the rigidity of the coil and the bobbin needs to be increased. In the main resonance mode described above, the substantially annular-shaped coil and the bobbin joined thereto with adhesive or resin are deformed within a plane of the coil in a manner of collapsing the annulation.

As a conventional art for increasing the rigidity of the coil and the bobbin, a technique has been described in JP-A-63-277458 (prior art 1). This involves bonding the coil to the coil bobbin of a ceramic material and fastening the bobbin to the carriage.

This prior art 1 requires fastening the ceramic bobbin to the carriage body made from aluminum or the like, increasing the number of assembling steps and therefore the cost. Further, ceramic materials easily produce dust particles which may adversely affect the reliability of the magnetic disk drive.

The prior art 1, although it can improve the rigidity as ceramics have a high specific rigidity, has a drawback that the ceramics are difficult to handle because of the dust particle problem. For example, using a ceramic in the disk drive with its surface exposed is troublesome from the standpoint of securing the reliability.

Further, when, besides ceramics, a metal material such as stainless steel with high rigidity is used for improving the rigidity, another problem arises. Since the bobbin moves in a very strong magnetic field between parallel magnets of the voice coil motor, a conductive metal material produces an eddy current in its surface which in turn generates a reverse magnetic field, reducing the electromagnetic force produced in the coil.

BRIEF SUMMARY OF THE INVENTION

It is therefore an object of the present invention to increase the rigidity of a carriage so as to improve the magnetic head positioning accuracy, thereby providing a magnetic disk drive with an increased recording capacity. Another object of the invention is to provide a method of assembling a carriage having a coil and a bobbin that can increase the rigidity of the carriage.

The above objectives can be achieved by a magnetic disk drive which comprises at least one magnetic head reading and writing information on at least one magnetic disk, a carriage supporting the magnetic head over the magnetic disk for movement about a pivot shaft, and an annular coil supported by a bobbin provided on the carriage and subjected to an electromagnetic force for driving the carriage. The drive further comprises a first connection member joining the annular coil and the bobbin, an in-coil member arranged on an inner side of the annular coil, and a second connection member joining the in-coil member and the annular coil, wherein a modulus of longitudinal elasticity of the in-coil member is larger than that of the first or second connection member.

Further, the first connection member is formed to cover surfaces of the in-coil member that face in an axial direction of the pivot shaft. The in-coil member is sealed in the second connection member.

Moreover, a surface of the in-coil member is formed with recessed and raised portions or with through-holes.

Furthermore, the above objectives can be achieved by a method of manufacturing a carriage for at least one magnetic disk of a magnetic disk drive that includes at lease one magnetic head reading and writing information on the magnetic disk, a carriage supporting the magnetic head over the magnetic disk for movement about a predetermined shaft, and an annular coil supported by a bobbin provided on the carriage and subjected to an electromagnetic force for driving the carriage. The method comprises the step of insert-molding, inside the annulation of the coil, a member that is larger in rigidity than a connection member used to join the coil to the bobbin and another connection member filled inside the annulation of the coil, so that the insert-molded member is joined to the inside of the annulation of the coil.

With this construction, the coil and the reinforcement member can be joined to the bobbin in one step, thus improving the assembling productivity. In addition, a hardening jig as used in the case of bonding is not required, thereby enabling a reduction of the cost.

Other objects, features and advantages of the invention will become apparent from the following description of the embodiment of the invention taken in conjunction with the accompanying drawings.

DETAILED DESCRIPTION OF THE INVENTION

An embodiment of the present invention will be now described with reference to the accompanying drawings.

Figure 2:
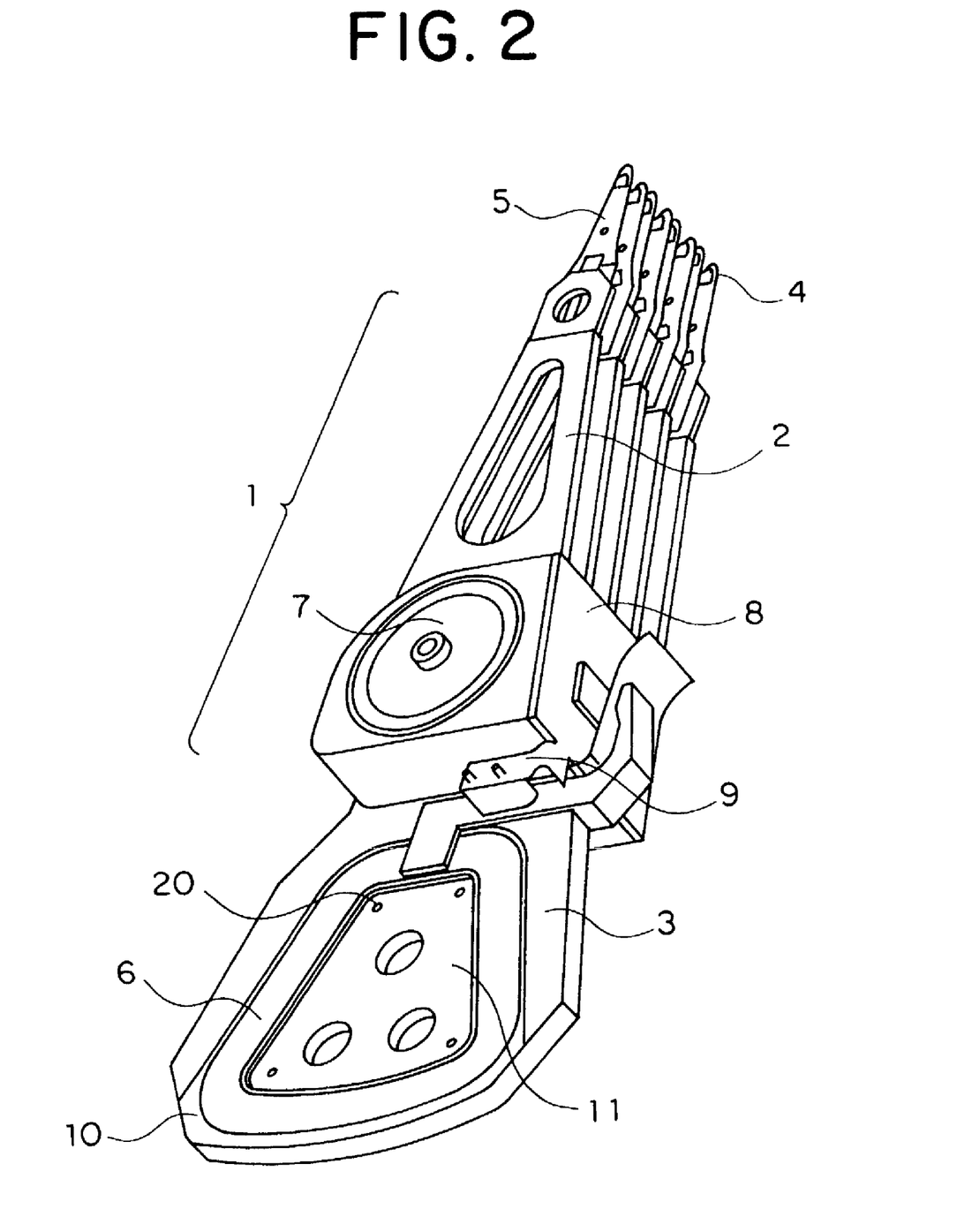
FIG. 2 is an overall view of the carriage in the embodiment of the invention.

FIG. 2 is a perspective view showing the overall configuration of a carriage according to the first embodiment of the invention. A carriage block 1, serving as a body of the carriage, is made by extruding an aluminum material into its outline and then machining it to form the shapes of arms 2, a coil bobbin 3 and so forth. The coil bobbin has two arm portions and is provided on the carriage block 1 at a central portion thereof with respect to a direction of height, which is an axial direction of a pivot 7 described later. Between these arm portions is disposed a coil 6 which is joined by a connection member to the arm portions or the pivot shaft of the carriage block 1 to be supported on the carriage. An electromagnetic force generated by an electric field acts on the coil and works about the pivot shaft along a plane defined by the arm portions (a plane almost parallel to the magnetic disk surface and flush with the annulation of the coil).

Installed on the carriage body 1 are suspensions 5, on which magnetic heads 4 are mounted, the coil 6 for generating a driving force, the pivot 7 supporting the carriage for swing motion, and a flexible printed circuit board (EPC) 8 having an amplifier mounted thereon for relaying or amplifying signals from the magnetic head 4.

In most of the drives currently available the coil 6 and the coil bobbin 3 supporting it are provided on an opposite side of the pivot 7, serving as a rotating center, to the magnetic heads 4. The FPC 8 is installed on a side surface of the carriage block 1 near its center. The FPC 8 is formed by bonding together a laminated portion having the amplifier mounted thereon and a thin FPC portion of a single layer. A part of the single-layer FPC portion is extended to form coil current lines 9 that are soldered to the ends of the coil 6 on terminals 14.

Figure 3:
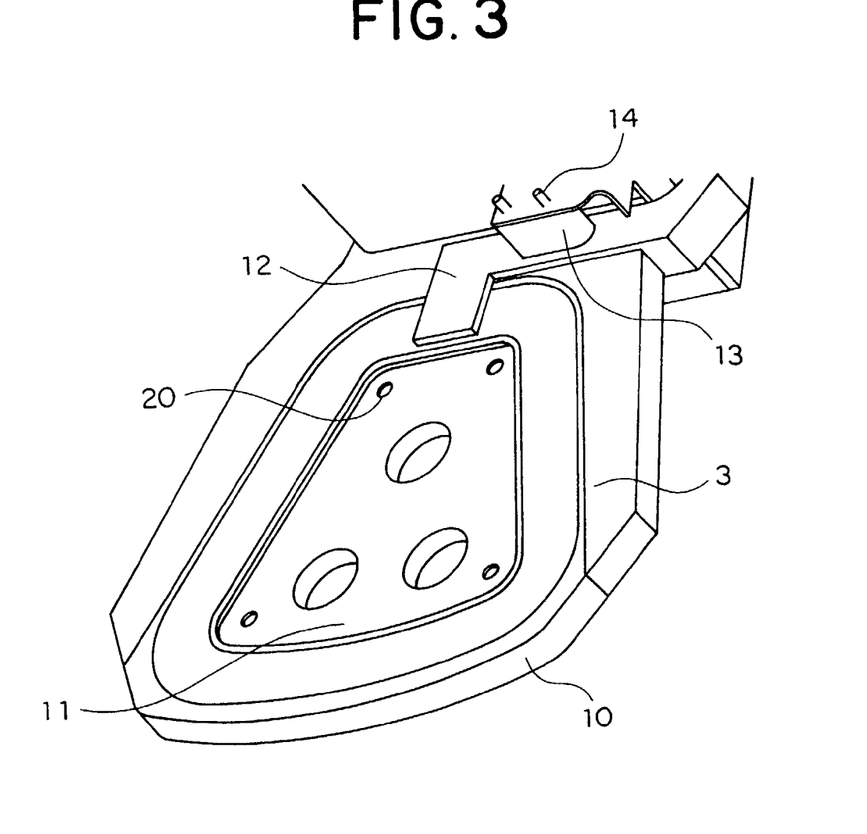
FIG. 3 is an enlarged view of a bobbin in the embodiment of the invention.

FIG. 3 is an enlarged view of the coil 6, the bobbin 3 and their associated components in FIG. 2. In this figure individual turns or windings of the coil 6 are not shown. The coil 6 is joined to the bobbin 3 by an external molding 10 filled between them so that the coil 6 is supported by the bobbin. On the inner side of the coil 6 is filled an internal molding 11. The both end windings of the coil 6 pass through an inside of a cover molding 12 to be connected to the terminals 14 on the top of a terminal molding 13. These external molding 10, internal molding 11, cover molding 12 and terminal molding 13 are given different names for explanation of their shapes but actually are molded of the same material at once during injection molding.

The internal molding 11 and the external molding 10, although formed of the same material in this embodiment, may be made of different materials.

Figure 1:
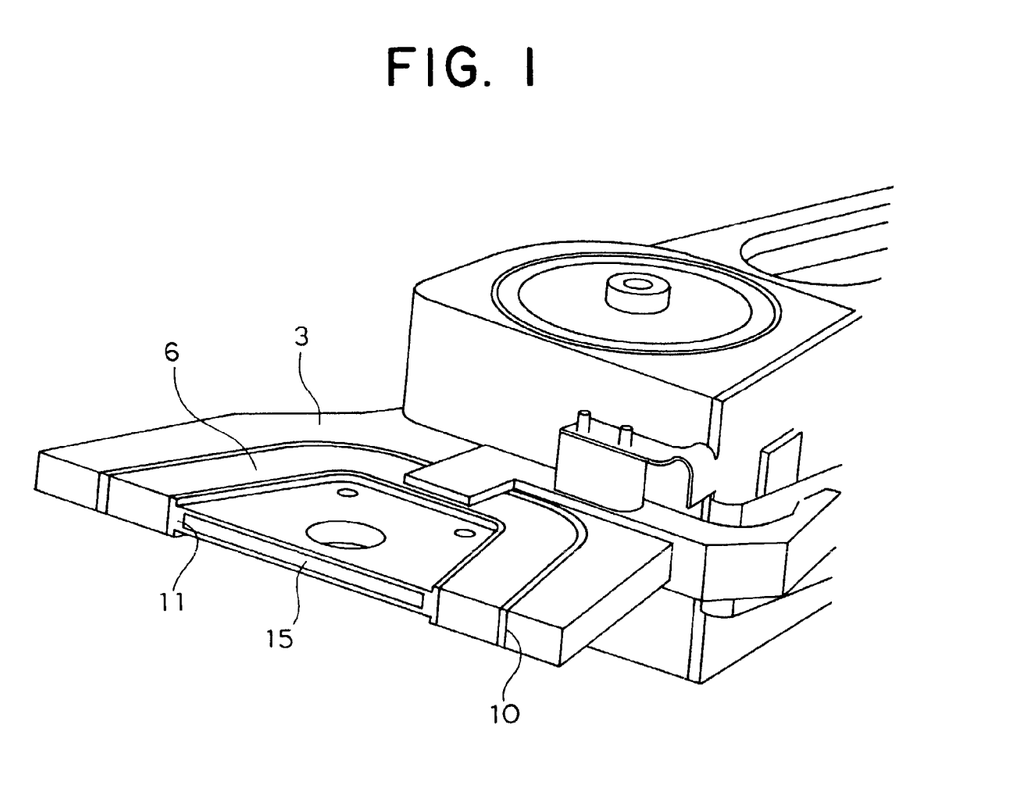
FIG. 1 is a cut-away view of a carriage in an embodiment of the present invention.
Figure 4:
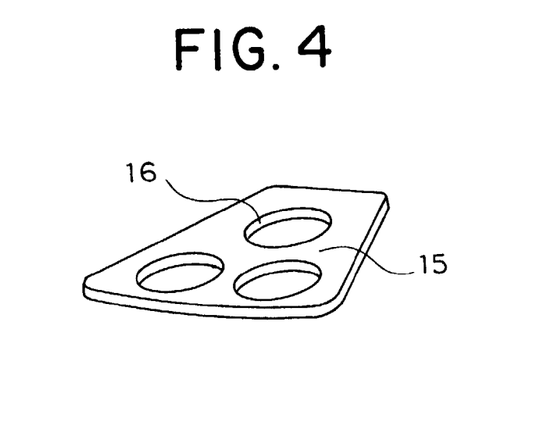
FIG. 4 is an outside view of a reinforcement plate 15.

FIG. 1 shows a cross section of the bobbin 3 and the coil 6 partly cut away. On the inner side of the generally annular coil 6 are provided with a member of a plate shape and the internal molding 11 that encloses and supports the member while joining to the coil. In this embodiment, the plate-shaped member sealed inside the internal molding 11 is a reinforcement plate 15. The surfaces of the reinforcement plate 15 facing in the direction of the pivot shaft 7 are covered with the internal molding 11. FIG. 4 shows the reinforcement plate 15. In this embodiment the reinforcement plate 15 is made from alumina ($Al_2O_3$), which has a volume specific resistance of $10^{14}$ Ωcm or higher and therefore substantially no electrical conductivity. It has a very high modulus of longitudinal elasticity of $3.7 \times 10^{11}$ $N/m^2$, about five times that of aluminum ($6.8 \times 10^{10}$ $N/m^2$) and 18 times that of resin ($1.6 \times 10^{11}$ $N/m^2$) used for insert molding of liquid crystal polymer or the like, and is very high in rigidity. In this invention it is also possible to use ceramic materials such as silicon nitride ($Si_3N_4$), silicon carbide (SiC) and zirconia ($ZrO_2$) which also have large volume specific resistances and almost no conductivity. Even silicon nitride and silicon carbide have moduli of longitudinal elasticity of $2.9 \times 10^{11}$ $N/m^2$ or more, which are very large as compared to that of aluminum, and thus can greatly increase the rigidity of this reinforcement member.

Although an electromagnetic steel sheet (silicon steel sheet) with a low conductivity may be used, because its modulus of longitudinal elasticity is $1.9 \times 10^{11}$ $N/m^2$ and its density is $8.0 \times 10^3$ $kg/m^3$, which is higher than that of ceramics ($3.0-4.0 \times 10^3$ $kg/m^3$), it is slightly inferior in terms of specific or comparable rigidity. Since the carriage is provided for swing motion to move the head, the smaller the inertia, the more improved its acceleration ability will be. Thus, even the reinforcement plate 15 used to improve the flexural rigidity of the bobbin 3 and coil 6 preferably has a lighter weight. Hence, it is worth using ceramic materials with high specific rigidity for the reinforcement plate.

Figure 5:
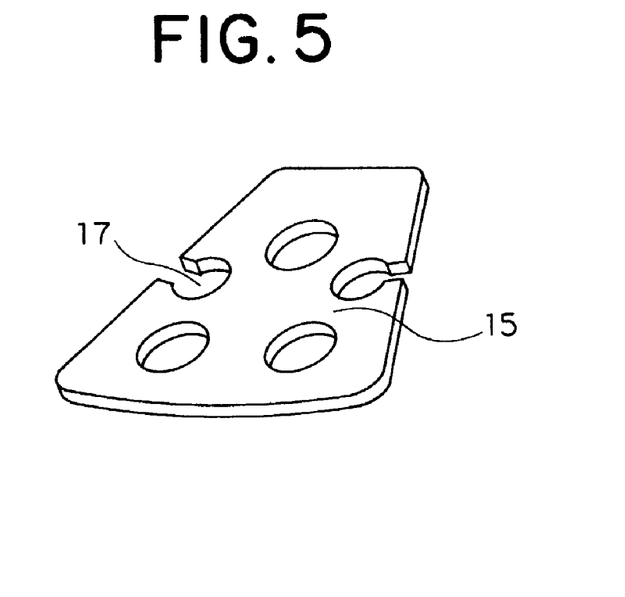
FIG. 5 shows another example of a reinforcement plate 15.
Figure 6:
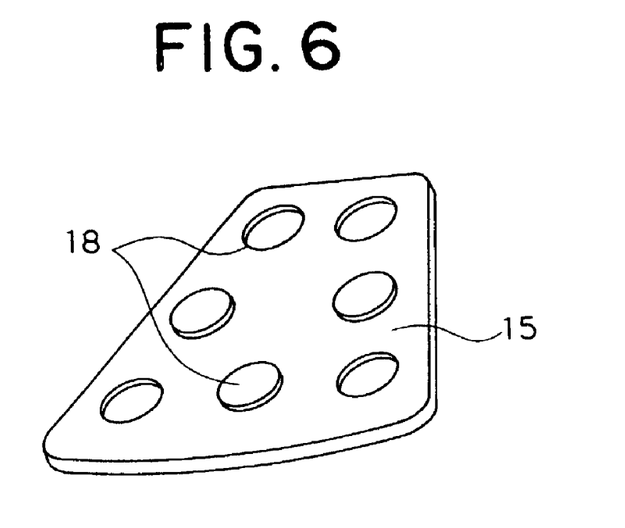
FIG. 6 shows still another example of a reinforcement plate 15.

The reinforcement plate 15 is shaped like a flat plate and its outer side geometry is determined so as to conform to the inner side geometry of the coil 6. Although in this embodiment the reinforcement plate 15 is formed with through-holes 16, it may be provided with notches 17 in its outer periphery as shown in FIG. 5 or, instead of the through-holes, with recessed and raised portions 18 as shown in FIG. 6. The similar effects may be produced by forming grooves in the surface of the reinforcement plate 15.

There are two purposes for forming these through-holes 16 or the like. The first purpose is to reduce the weight. Although the ceramic has a high specific rigidity, it is preferred that the reinforcement plate 15 have as small a weight as possible. Therefore, holes, grooves or recesses are formed to reduce the weight of the reinforcement plate while maintaining an enough stiffness.

The second purpose is to have the resin fill the holes, grooves or recesses so as to increase an area for contact with the internal molding 11 and, in terms of geometry, firmly engage the reinforcement plate 15 with the molding resin, thus enhancing their intimate contact. This can avoid a reduction in contact rigidity at the boundary portion. Although the provision of these through-holes 16 and notches 17 renders the reinforcement plate 15 complex in shape, the productivity cannot be impaired as long as the material is ceramics, because the ceramic material is formed in that shape through sintering. Further, since during the injection molding the resin of the internal molding 11 flows around the reinforcement plate 15 and fills the holes or recesses, no special manufacturing process is required.

Further, the upper and lower surfaces and side surfaces of the reinforcement plate 15 are completely covered with the resin, and therefore, when the reinforcement plate 15 is made from ceramics, fine hard dust particles that may chip away from the surface can be shut in the resin, greatly reducing a possibility of these particles scattering inside the magnetic disk drive 21. Hard dust particles, when they fall on the surface of the disk 22, may be trapped between the head 4 and the disk 22 to cause damages to the disk 22 and head 4. Thus, it is necessary to minimize the possibility that such particles may disperse in the disk drive.

Figure 7:
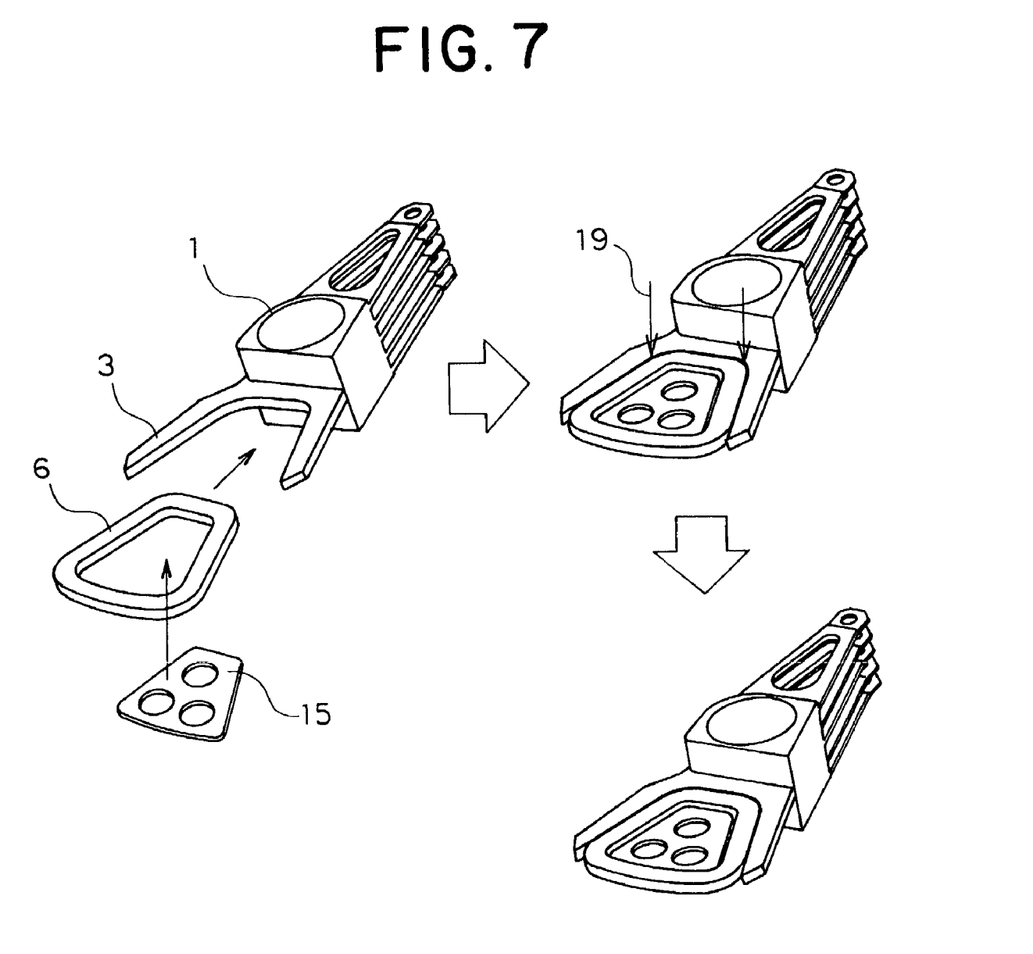
FIG. 7 is a view showing an assembling method of the carriage in the embodiment of the invention.

FIG. 7 shows a part of the process of assembling the carriage using insert molding. The carriage block 1, the coil 6 and the reinforcement plate 15 are manufactured separately, and these parts are placed in a mold. High-temperature and high-pressure resin is injected into the mold in a direction of arrows 19 to fill spaces between the parts and join them together. At this time, pin holes 20 shown in FIG. 2 may be formed in the molded resin by pins used to position or hold the coil 6 and reinforcement plate 15 in the mold. Particularly, the pin holes 20 formed for supporting the reinforcement plate 15 can partly expose the reinforcement plate 15. Thus, it is desired to seal the pin holes 20 by, for example, dropping a diluted adhesive into the holes at the last of the assembly process.

Figure 8:
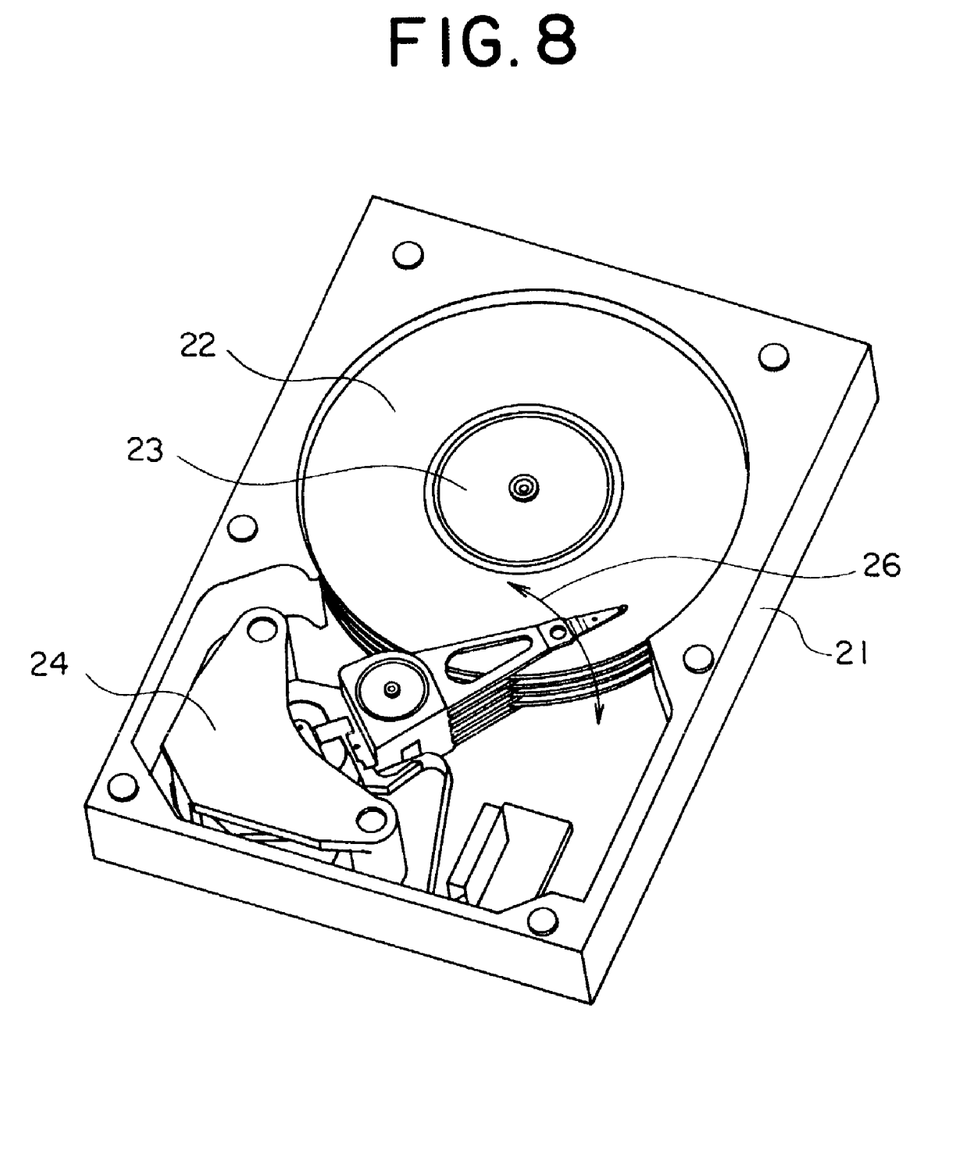
FIG. 8 is an outline view of a magnetic disk drive to which the embodiment of the invention is applied.
Figure 9:
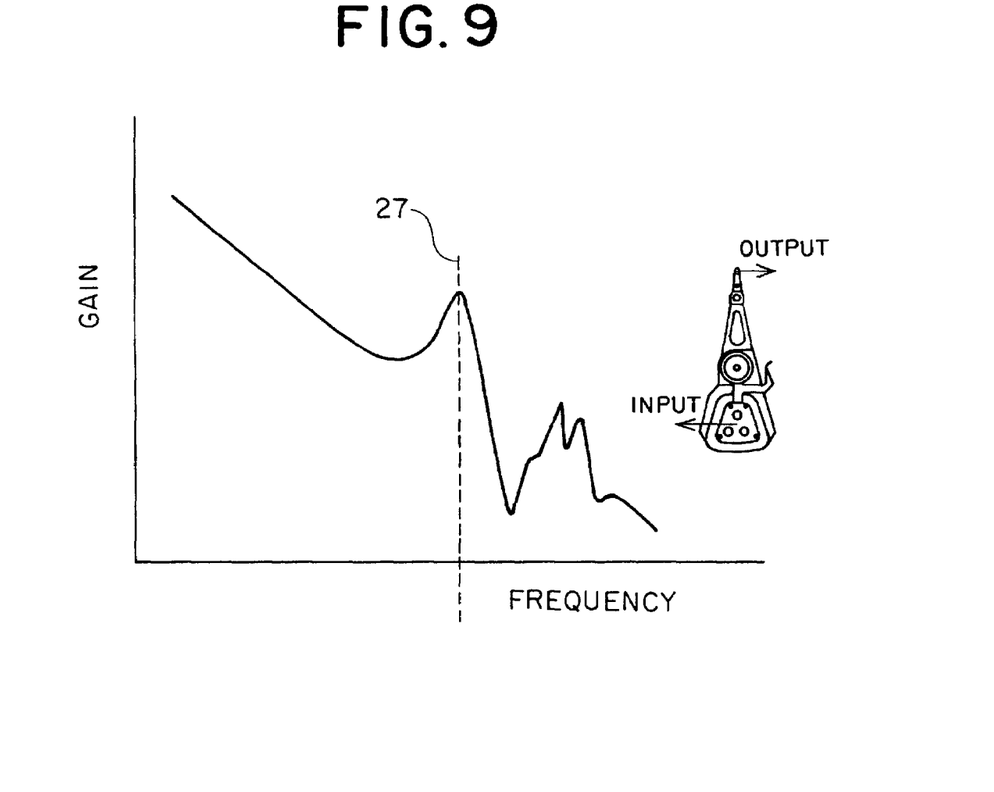
FIG. 9 is a diagram showing a transfer characteristic of the carriage.

The carriage block 1 having the coil 6 and the reinforcement plate 15 joined in the process shown in FIG. 7 is then installed with the suspensions 5, the FPC 8 and the pivot 7 to complete the assembly of the carriage. The carriage thus assembled is mounted on a base 25 along with a disk spindle assembly 23 having disks 22 thereon and a magnet assembly 24, thus completing the magnetic disk drive 21. The outline view of the assembled magnetic disk drive is shown in FIG. 8. The voice coil motor made up of the coil 6 and the magnet assembly 24 swings the carriage in the directions of arrows 26 to position the head 4 at a targeted track (not shown). A servo band of a positioning control system is determined by a transfer characteristic of the carriage which is represented by a frequency characteristic of a displacement of the head 4 relative to a thrust input to the coil 6. FIG. 9 shows the transfer characteristic. Herein, an intrinsic or natural mode of the lowest order on the transfer characteristic is referred to as a main resonance mode. This is the resonance mode in which the entire carriage vibrates in the direction of a head movement as described above. In this mode the servo band of the control system is limited by the main resonance frequency 27. Thus, to improve a disturbance suppression capability of the disk drive for precision positioning requires expanding the servo band. Therefore, increasing the main resonance frequency leads to an improved positioning accuracy of the magnetic disk drive, which in turn increases the recording capacity of the disk drive.

Figure 10:
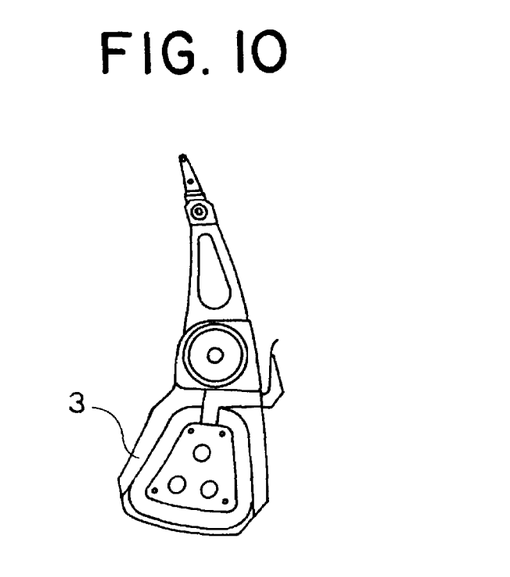
FIG. 10 is a schematic view showing a shape of the carriage in a main resonance mode.

FIG. 10 shows an outline of a mode shape for the main resonance mode. This main resonance mode is a vibration mode that can be modeled by the carriage mass and a total spring rigidity, which is a combination of a rigidity of a bearing of the pivot 7 and a flexural rigidity of the carriage against its entire bending. Hence, it is required for increase of the main resonance frequency to improve the flexural rigidity of the carriage. Because the arm 2 and the bobbin 3 are bent to a particularly large extent, it is understood that a flexural rigidity of the bobbin 3 and coil 6 as well as an in-plane flexural rigidity of the arm needs to be improved. When focusing on the bending of the bobbin 3 and coil 6, in the main resonance mode the generally annular coil 6 deforms in the plane thereof in a manner of collapsing the annulation. It is therefore possible to greatly improve the flexural rigidity of the coil by placing the reinforcement plate 15 of a high rigidity inside the coil 6.

Further, the materials of the external molding 10 and the internal molding 11 may be changed, or the rigidity of the internal molding 11 may be set higher than that of the external molding 10. The thus increased rigidity inside the coil ring can reduce the deformation of the coil 6 caused by a vibration force applied and thereby minimize the deformation of the carriage. Furthermore, the reinforcement plate 15 placed inside the internal molding 11 which has a still higher rigidity can further minimize the deformation of the carriage.

Taking the case of a carriage in a general 3.5-inch magnetic disk drive, when the internal molding 11 and the reinforcement plate 15 are not provided inside the coil 6, the main resonance frequency of the carriage is 4.1 kHz. In contrast, when only the internal molding 11 is used to fill the interior of the coil 6, without using the reinforcement plate 15, the main resonance frequency becomes 4.25 kHz, bringing about an improvement of 150 Hz. Further, when a reinforcement plate 15 of alumina is insert-molded in the molding of the same thickness, the main resonance frequency is 4.6 kHz, achieving an improvement of 500 Hz. If the material of the reinforcement plate 15 is changed to aluminum, the main resonance frequency is 4.38 kHz, and the improvement is about a 280 Hz. When stainless steel is used, it is 4.3 kHz, and the improvement is about 200 Hz. This may be explained that since stainless steel has a higher density, the increased mass reduces the effect of an improved rigidity. It is therefore possible to improve the main resonance frequency by selecting for the material of the reinforcement plate 15 a ceramic that has a very large ratio of the modulus of longitudinal elasticity relative to the density.

Figure 11:
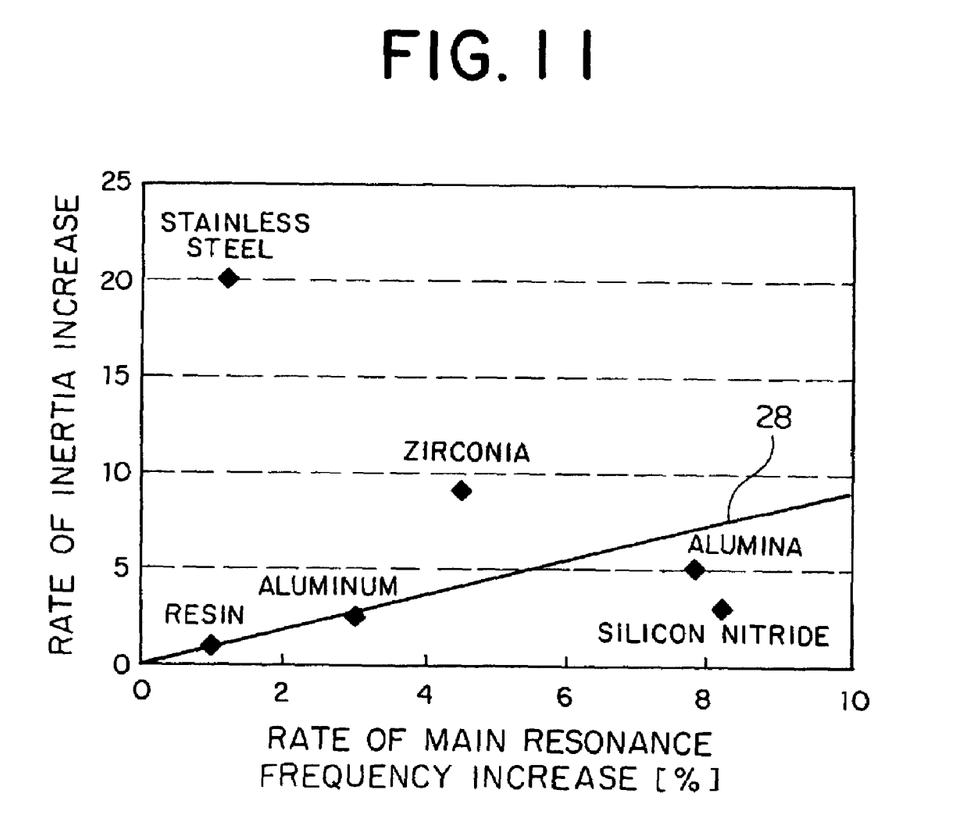
FIG. 11 is a diagram showing a relation between a main resonance frequency increase and an inertia increase.

In practice, however, since the carriage preferably has as small an inertia about the rotating shaft as possible in terms of an acceleration capability, the material selection is a tradeoff between the elastic modulus-to-density ratio and an increased inertia. FIG. 11 shows a relation between the rate of a main resonance frequency increase from a reference frequency of the molding resin and the rate of an inertia increase. In this diagram the characteristic becomes more desirable as a characteristic plot in the diagram approaches the lower right where the main resonance frequency increase is large for an inertia increase. Taking the case where the inside of the coil is filled with a resin as a reference, a characteristic plot needs to fall on the lower side of a line 28 of FIG. 11 to be a more preferred change from the resin filling.

From FIG. 11 the materials conforming to this requirement include aluminum, silicon nitride and alumina. Aluminum has a high electrical conductivity, and a reduction in thrust due to an eddy current must be taken into account. A ceramic, such as alumina, has a low conductivity and also can meet conflicting requirements, i.e., a main resonance improvement and an inertia reduction. The reason that these conflicting performances can be improved simultaneously is that these materials have high rigidities which are more than 18 times higher as compared with the molding resin in terms of the modulus of longitudinal elasticity and more than 10 times higher in terms of the ratio of modulus of longitudinal elasticity relative to the density.

Compared with a carriage to which the above construction is not applied, the carriage according to the embodiment of the invention can improve the servo band by the transfer characteristic of a mechanism system having a high main resonance frequency even when they have the similar acceleration capabilities in terms of thrust and inertia. Further, this construction can provide the carriage which does not suffer from a decrease of the reliability due to dust particles and which excels in assembling productivity. Further, with this carriage it is possible to provide a high-speed, high-density magnetic disk drive.

In the drawings made reference to for the above description, the ratio of length and breadth of the drive and the proportion of respective parts are not necessarily correct for the sake of explanation.

According to the above embodiment, it is possible to provide a carriage which can realize a high main resonance frequency without a reduction in the acceleration capability as an actuator, such as a thrust reduction and an inertia increase, and without a reduction in reliability due to dust particles, and which excels in assembling productivity. This in turn leads to a fast-speed, high-density magnetic disk drive.

As described above, according to the invention the rigidity of a carriage can be increased to improve the positioning accuracy of the magnetic head, thereby realizing a magnetic disk drive with a large recording capacity. Another feature of the invention can provide a method of assembling a carriage that has a coil and a bobbin capable of increasing the rigidity of the carriage.

It will be further understood by those skilled in the art that the foregoing description has been made on the embodiment of the invention and that various changes and modifications may be made in the invention without departing from the spirit of the invention and the scope of the appended claims.

What is claimed is:

1. A magnetic disk drive comprising:
    at least one magnetic head reading and writing information on at least one magnetic disk;
    a carriage supporting the magnetic head over the magnetic disk for movement about a pivot shaft;
    an annular coil supported by a bobbin provided on the carriage and subjected to an electromagnetic force for driving the carriage;
    a first connection member joining the annular coil and the bobbin;
    an in-coil member arranged on an inner side of the annular coil; and
    a second connection member joining the in-coil member and the annular coil, said in-coil member having a modulus of longitudinal elasticity which is larger than a modulus of longitudinal elasticity of at least one of the first and second connection member.

2. A magnetic disk drive according to claim 1, wherein said first connection member is formed to cover surfaces of the in-coil member that face in an axial direction of the pivot shaft.

3. A magnetic disk drive according to claim 2, wherein said in-coil member is sealed in the second connection member.

4. A magnetic disk drive according to claim 3, wherein said in-coil member is formed in a surface thereof with recessed and raised portions or with through-holes.

5. A magnetic disk drive according to claim 2, wherein said in-coil member is formed in a surface thereof with recessed and raised portions or with through-holes.

6. A magnetic disk drive according to claim 1, wherein said in-coil member is formed in a surface thereof with recessed and raised portions or with through-holes.

7. A magnetic disk drive according to claim 1, wherein said in-coil member is a reinforcing plate.

* * * * *